United States Patent
Jacober et al.

[11] Patent Number: 6,134,608
[45] Date of Patent: Oct. 17, 2000

[54] APPARATUS FOR PROVIDING MULTIPLE NETWORK SERVICES USING A SINGLE SERIAL COMMUNICATIONS PORT

[75] Inventors: Olivier Jacober, Vence; Olivier Casile, Saint Laurent du Var, both of France

[73] Assignee: International Business Machines Corporation, Armonk, N.Y.

[21] Appl. No.: 08/955,208

[22] Filed: Oct. 21, 1997

[30] Foreign Application Priority Data

Dec. 20, 1996 [EP] European Pat. Off. ............. 96480119

[51] Int. Cl.$^7$ ............................................. G06F 13/14
[52] U.S. Cl. ........................................ 710/40; 710/240
[58] Field of Search ............................. 395/382, 500, 395/600, 828, 882, 883, 884, 200.58, 834, 200.33, 200.5, 880, 200.43; 370/318, 313, 245, 382; 358/403, 407; 379/59, 100.13; 455/33.1; 326/83, 86; 710/36–45, 240–241

[56] References Cited

U.S. PATENT DOCUMENTS

| | | | |
|---|---|---|---|
| 4,594,657 | 6/1986 | Byrns | 710/241 |
| 4,780,822 | 10/1988 | Miller | 710/241 |
| 5,455,572 | 10/1995 | Cannon et al. | 340/825.44 |
| 5,504,928 | 4/1996 | Cook et al. | 395/882 |
| 5,726,764 | 3/1998 | Averbuch et al. | 358/403 |
| 5,784,633 | 7/1998 | Petty | 395/880 |
| 5,801,549 | 9/1998 | Cao et al. | 326/83 |
| 5,802,306 | 9/1998 | Hunt | 395/200.58 |

FOREIGN PATENT DOCUMENTS

96/35286  11/1996  WIPO.

OTHER PUBLICATIONS

IBM Technical Disclosure Bulletin, vol. 36, No. 12, Dec. 1993 "Resource Virtualization Algorithm for Multimedia Physical Device Drivers".

*Primary Examiner*—Richard L. Ellis
*Attorney, Agent, or Firm*—John J. Timar; John D. Flynn

[57] ABSTRACT

Data communications apparatus is described comprising a general purpose computer and an adapter for enabling the computer to be connected to a data communications network. The computer and the adapter are interconnected by a data card interface. The general purpose computer comprises a first driver arranged to provide a first application program with a data transport connection to the data communications network via the data card interface using a serial COM port. A second driver is arranged to enable a second application program to communicate with the adapter simultaneously with said first application. The adapter is arranged to enable the second application program to make use of additional data services provided by said network via the second driver program. In this way, in addition to its serial communication channel an alternate communication channel is provided between the data card and the computer which allows other applications to make use of the additional data services provided by the network.

9 Claims, 6 Drawing Sheets

APPARATUS FOR PROVIDING MULTIPLE NETWORK SERVICES USING A SINGLE SERIAL COMMUNICATIONS PORT

FIELD OF THE INVENTION

The invention relates to data communications and, more particularly, to data communications apparatus comprising a general purpose computer and an adapter for enabling the computer to be connected to a data communications network.

BACKGROUND DESCRIPTION

Recently, adapters have been developed which provide personal computers, in particular portable computers, with the capability to communicate with other computers via a radio telephone network infrastructure.

For the present generation of portable computers, such adapters are typically marketed in the form of data cards configured in accordance with well known Personal Computer Memory Card International Association (PCMCIA) standards. Such data cards contain the logic and software that allow a portable computer to communicate over a radio telephone network infrastructure via a mobile telephone, such as a Global System for Mobile Communications (GSM) mobile telephone. The existing facilities of the mobile telephone are used to allow data communication via the radio telephone network, with the mobile telephone supporting the various protocols required for communication over the network.

Similar devices have also been proposed, known as transceivers, which are in the form of PCMCIA data cards but which themselves contain all the hardware and software functions of a mobile telephone, so that a separate mobile telephone is not required.

Generally, the design of known such data cards of both types is such that the card appears to the computer to be a conventional wired modem. In other words, the computer communicates via the card through one of the serial communications (COM) ports of the computer using exactly the same interfaces and commands that it would use with a wired modem. The advantage of this approach is that existing software, which has been developed for use with conventional wired modems can be used unchanged with the data cards.

However, modern digital radio telephone networks offer more facilities than the traditional analog telephone networks for which conventional modems were designed. Consequently, there are differences between a conventional modem and a data card which is designed, for instance, for use with a GSM network. A GSM data card, for example may offer not only data transport services, but may also be able to make use of supplementary services offered by the network, such as call cost and signal strength indications, and paging or messaging services. In modern networks, such as GSM networks, such additional services can be used concurrently with voice or data communications, so that one can receive a short message over the network whilst at the same time receiving a telephone call.

However, the use of these extra facilities via a conventional data card poses a problem because the architecture of present personal computers does not allow serial COM ports to be shared by simultaneous applications. So, for example, if a user wishes to leave a fax application running which is waiting to receive incoming faxes via the data card, they cannot at the same time read any short messages they receive using another application. In order to receive incoming short messages, the user must end and restart the fax application, which may not be easy or convenient.

Devices are known which allow at least paging services to be exploited by a computer and a data card. For example, U.S. Pat. No. 5,455,572 describes a pager in the form of a computer peripheral device which communicates with a computer via a PCMCIA memory-only interface. However, this device does not at the same time provide a data transport connection to the network via a serial COM port.

SUMMARY OF THE INVENTION

It is an object of the present invention to solve the above described problem by providing a general purpose computer with the capability to support simultaneous use by more than one application program of a plurality of data services in a network via a data card interface.

In brief, this object is achieved by data communications apparatus comprising a general purpose computer and an adapter for enabling the computer to be connected to a data communications network, the computer and the adapter being interconnected by a data card interface, wherein the general purpose computer comprises a first driver arranged to provide a first application program with a data transport connection to the data communications network via the datacard interface using a serial COM port, characterised by a second driver arranged to enable a second application program to communicate with the adapter simultaneously with said first application, and in that the adapter is arranged to enable the second application program to make use of additional data services provided by said network via the second driver program.

In this way, in addition to its serial communication channel an alternate communication channel is provided between the data card and the computer which allows other applications to make use of the additional data services provided by the network.

In at least a preferred embodiment, the adapter comprises a memory having at least an area which is shared between the computer and the adapter. The second driver can then communicate with the adapter via the shared memory.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
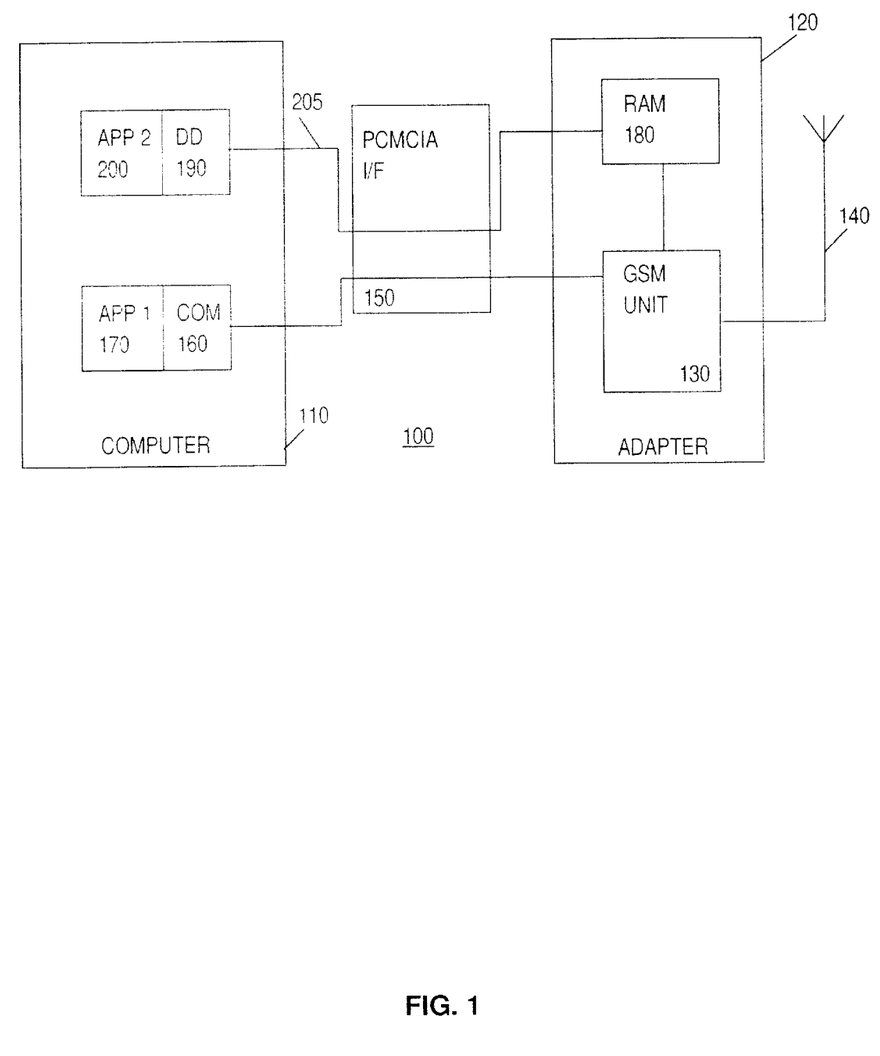
FIG. 1 is a schematic diagram show data communications apparatus.

FIG. 1. shows, in schematic form, a data communications apparatus 100 comprising general purpose computer 110, which may be a portable lap-top computer such as an IBM ThinkPad computer available from International Business Machines Corporation (IBM and ThinkPad are trademarks of IBM Corp).

The present embodiment will be described with respect to a GSM mobile telecommunication network. GSM is a set of standards for mobile telecommunications networks which are administered by the European Telecommunications Standards Institute (ETSI). Technical details of the standards can be found in a set of GSM Technical Specifications available from ETSI.

It will be appreciated that while the present embodiment has been described with respect to the features and facilities of existing GSM networks, the invention is applicable to other types of wired and wireless networks which provide similar data services.

Connected to computer 110 is an adapter 120 which enables the computer to be connected to a GSM data communications network via GSM unit 130 and antenna 140. In the preferred embodiment, adapter 120 is in the form of a data card connected via a suitable interface to a mobile telephone (not shown). In this case the function of GSM unit 130 is provided by the mobile telephone. Alternatively, adapter 120 may be in the form of a data card which itself includes the necessary GSM functionality 130. The operation of GSM unit 130 is well known and will not be described in detail herein.

Computer 110 and the data card part of adapter 120 are interconnected by PCMCIA interface 150. PCMCIA interface is constructed and controlled in a manner described in the "PC Card Standard" release 2.0 published by the Personal Computer Memory Card International Association. Of course, the present invention is applicable to data card interfaces other than the PCMCIA interface.

The computer 110 comprises a first driver program 160 which provides a first application program 170 with a data transport connection to the GSM network via the PCMCIA interface using a serial COM port. First application program may be, for example, a fax or electronic mail application, a browser program for the World Wide Web, a database access program or any other kind of program which requires a data transport connection to a data communications network. Application 170 interacts with PCMCIA interface 150 via driver 160 as if it were connected to a conventional modem via a serial COM port.

Adapter 120 includes random access memory (RAM) 180. RAM 180 contains an area which is shared between the computer 110 and adapter 120, allowing each to exchange messages containing commands and responses with each other. In the present embodiment, these commands and responses are additional modem industry standard Attention (AT) commands specifically intended to control the additional services provided by the GSM network, such as the supplementary or messaging services. Of course, conventional AT commands and responses are also carried via driver 160 as they would be via any COM port through a conventional modem.

A second driver program 190 is present in computer 100 which enables a second application program 200 to communicate with the data card by writing and reading messages containing AT commands and responses to and from this shared RAM area. This can occur while the first application is running. This provides an alternate communication channel 205 between computer 110 and adapter 120.

As will be described below, adapter 120 is designed to enable application program 200 to make use of supplemental and messaging services provided by the GSM network via alternate channel 205 for example by giving a running indication of signal strength on the computer screen, or providing the facility for messages to be read on the computer screen. It will be appreciated that there are a wide variety of uses to which the information available via such additional services may be put and therefore there are a wide variety of functions that application 200 may have.

Details of the communication protocol used in the preferred embodiment between computer 110 and adapter 120 will be described in detail below. The sharing of a memory space between a computer and a data card via a PCMCIA data card interface and the means by which this can be readily implemented using commercially available chipsets will be well understood by those skilled in the art and need not be described in detail herein. Such a mechanism has the advantage of being relatively simple to implement, but it can only be used for low throughput since it is not interrupt-based and both computer 110 and adapter 120 must poll the shared RAM 180 for messages as described below. For this particular application, the traffic flowing over alternate channel 205 will be low since it only supports AT commands and responses, which only represents at most a few messages per second.

Figure 2:
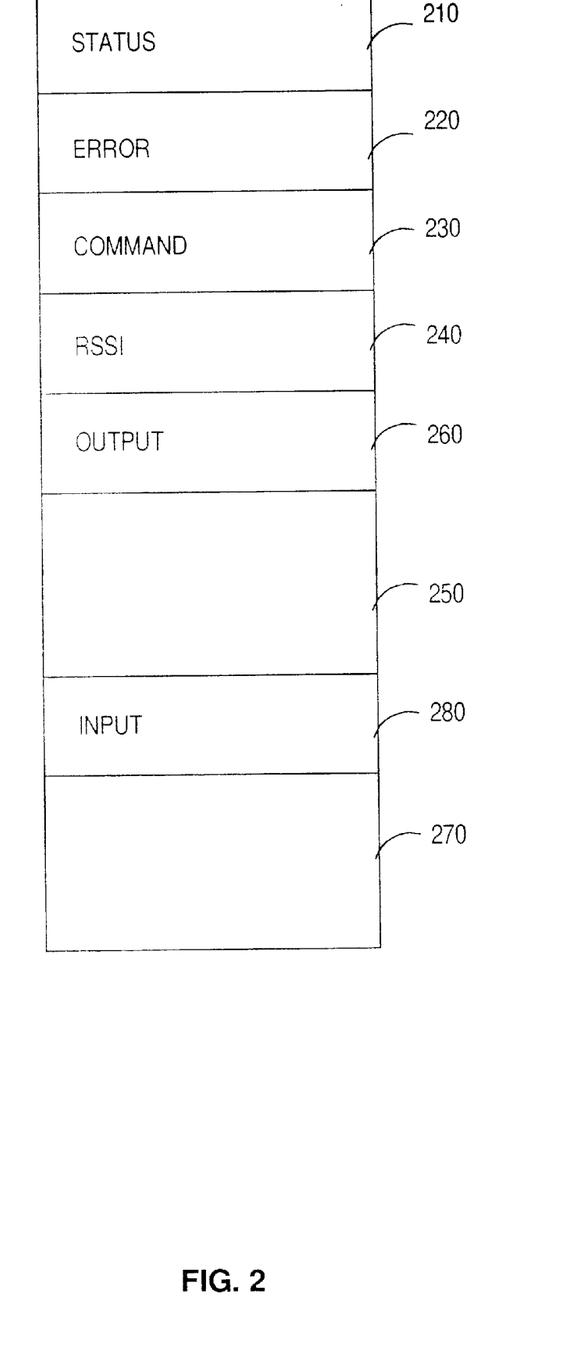
FIG. 2 shows data elements stored in RAM in the apparatus of FIG. 1.

The shared memory area in RAM 180 is composed of the following elements shown in schematic form in FIG. 2: a status byte 210 maintained by the adapter 120; an error code byte 220 maintained by the adapter 120; a command byte 230 used by the computer 110; an RSSI (Radio Signal Strength Indication) byte 240 maintained by the adapter 120; an output buffer 250 and associated output semaphore 260 used by the computer 110 to send AT commands to the adapter 120; and an input buffer 270 and its associated input semaphore 280 used by the adapter 120 to send AT responses and indications to the computer 110. These elements will be described in more detail below.

Status byte 210 is writable by adapter 120 but read-only by the computer 110. Status byte 210 contains the following elements.

(i) A status bit indicates whether or not the adapter is ready to receive and process commands, either from command byte 230 or output buffer 250. This bit should generally be on, but is off when the adapter is initializing or performing recovery.

(ii) An activity bit indicates whether or not the connection with the GSM network is active, ie a call is running.

(iii) A direction bit indicates whether unsolicited AT responses and indications from adapter 120 are directed to the serial COM port or to alternate channel 205. The default direction after adapter initialization is to the serial COM port. This direction can be changed by computer 110 using the command byte 230.

Error code byte 220 is writable by adapter 120, but read only by computer 110. It contains the result of the Power On Self Test (POST) performed by adapter 120 at initialization or on request of the computer 110. Non-zero values signify that an error has been detected by adapter 120.

Command byte 230 is readable and writable by both computer 110 and adapter 120. It contains the following elements.

(i) A direction bit specifies whether unsolicited GSM AT (+C) indications from adapter 120 to computer should be routed to the serial COM port or to the alternate channel.

(ii) A test request bit allows computer 110 to request an autotest of adapter 120. Adapter 120 will clear this bit when the auto test is complete and put the result in error code byte 220.

(iii) An unlock alternate channel request bit allows computer 110 to request that adapter 120 unlock alternate channel 205. Device driver 190 requests this operation when it needs to send a message and the output channel is not ready to receive. This condition should not normally occur because the communication mechanism between application 200 and adapter 120 is one to one. When receiving this request the adapter discards any AT command it is processing and does not send any final response for it to computer 110, then clears the Message Available indicator of the output channel (described below) which means that any pending AT command from computer 110 is discarded and finally sets the Ready to Receive indicator of the output channel (described below), which reauthorizes device driver 190 to send AT commands.

(iv) A soft reset request bit allows computer 110 to request that adapter 120 perform a soft reset. Computer 110 may request such an operation when it detects that the adapter is in an abnormal state, for instance because it does not accept any more commands and refuses to unlock the Alternate channel.

RSSI byte 240 contains the Radio Signal Strength Indication from the GSM network and is periodically updated, for instance once per second, by the adapter. It can be read at any time by computer 120.

The output channel is used by computer 110 to send messages containing AT commands to adapter 120. It is composed of buffer 250 and signalling indicator 260. Buffer 250 contains 512 bytes and allows computer 110 to post AT commands to adapter 120. Preferably the AT commands are standalone (i.e., not concatenated). Buffer 250 must be large enough to contain short messages in Protocol Data Units (PDUs). GSM Short Message Services (SMS) PDUs are up to 140 bytes long and encoded in hexadecimal using two characters per PDU byte. When the length of the AT command is added, this leads to more than 256 bytes, but less than 512.

Output semaphore 260 contains the following elements.

(i) A Ready to Receive (RR) indicator which is set by adapter 120 to inform computer 110 that it is ready to receive a new message.

(ii) A message available (MA) indicator which is used by computer 110 to signal to the adapter 120 that a new message is available for it in the data buffer 250.

The input channel is used by adapter 120 to send messages containing AT commands to computer 110. It is generally symmetrical to the output channel and is composed of buffer 270 and signalling indicator 280. Buffer 270 contains 512 bytes and allows adapter 120 to post AT commands to computer 120.

Input semaphore 280 contains the following elements.

(i) A Ready to Receive (RR) indicator which is set by computer 110 to inform adapter 120 that it is ready to receive a new message.

(ii) A message available (MA) indicator which is used by adapter 120 to signal to the computer 110 that a new message is available for it in the data buffer 270.

A two bit message type indicator is used to inform computer 120 about the type of content in the message. There are three content types:

(i) an intermediate response to an AT command, such as +CBR: phonebook entries sent by the adapter in response to a +CPBR=? AT command from computer 120;

(ii) an unsolicited AT indication, such as a ring indication or a +CREG: network registration status;

(iii) a final response, ie OK, ERROR, +CME ERROR.

These three possibilities are encoded using 2 bits of input channel semaphore byte 280.

The operation of alternate channel 205 will now be described.

Figure 3:
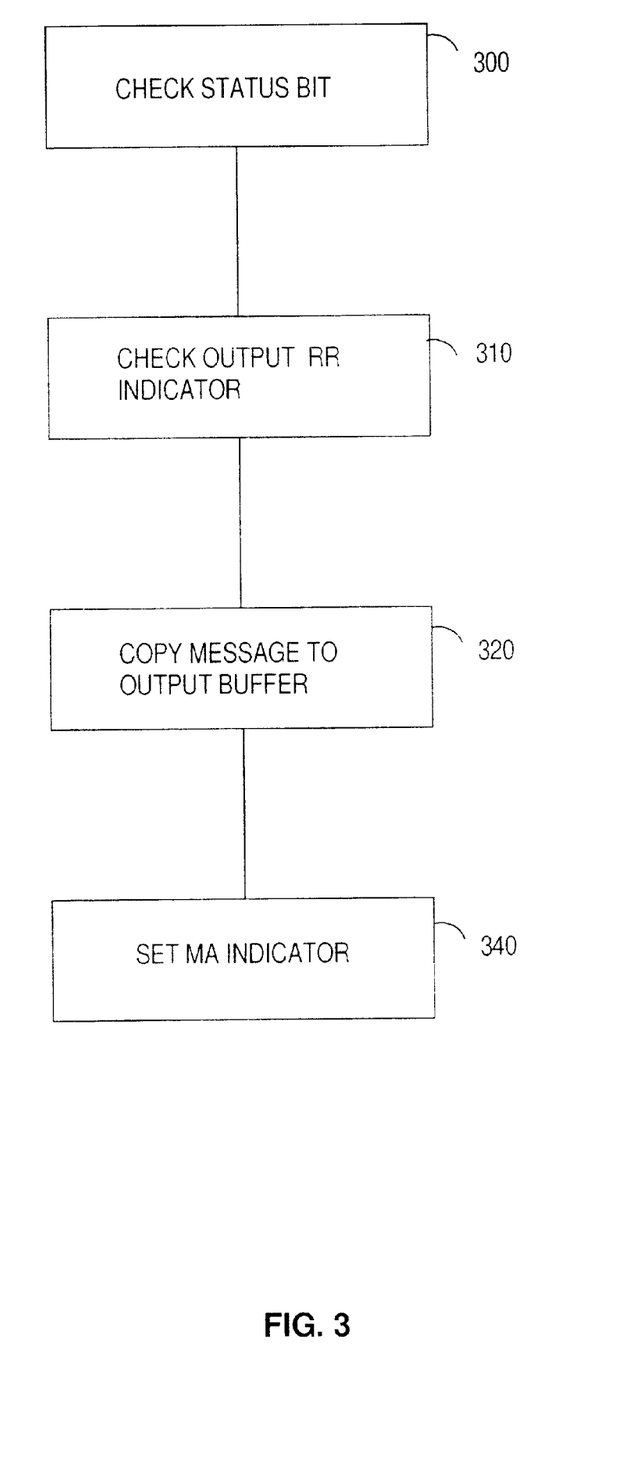
FIGS. 3, 4, 5 and 6 are flow diagrams illustrating the operation of communication channel 205 shown in FIG. 1.

The procedure followed when computer 110 wishes to post a message to adapter 120 is shown in flow diagram form in FIG. 3.

First, status bit of status byte 210 is checked in step 300 to determine whether or not adapter 120 is ready to receive commands. If adapter 120 is not ready, device driver 190 will inform application 200 that its AT command has been rejected. Application 200 then must determine whether to wait or to hard reset adapter 120 depending on whether it is in an initialization phase or in a steady state.

Next, the ready to receive indicator of the output channel is checked in step 310. If the output RR indicator is on, adapter 120 is ready to receive the message. If the output RR indicator is off, something is wrong because the one-to-one communication mechanism between computer 110 and adapter 120 means that if application 200 has a new command to send to the adapter, it must be because adapter 120 has sent to computer 110 the final response to the previous AT command and therefore has released the output channel. In this event, device driver 190 will ask for an alternate channel unlock, as described above in relation to command byte 230, and inform application 200 that its AT command has been rejected. If the unlock action is not successful then the next time computer 110 needs to send a message to adapter 120, application 200 could perform a soft or hard reset action on adapter 120.

The message is then copied to the output channel buffer 250 in step 320.

Finally, the MA indicator in output semaphore 260 is set to inform adapter 120 that a message is waiting for it.

Figure 4:
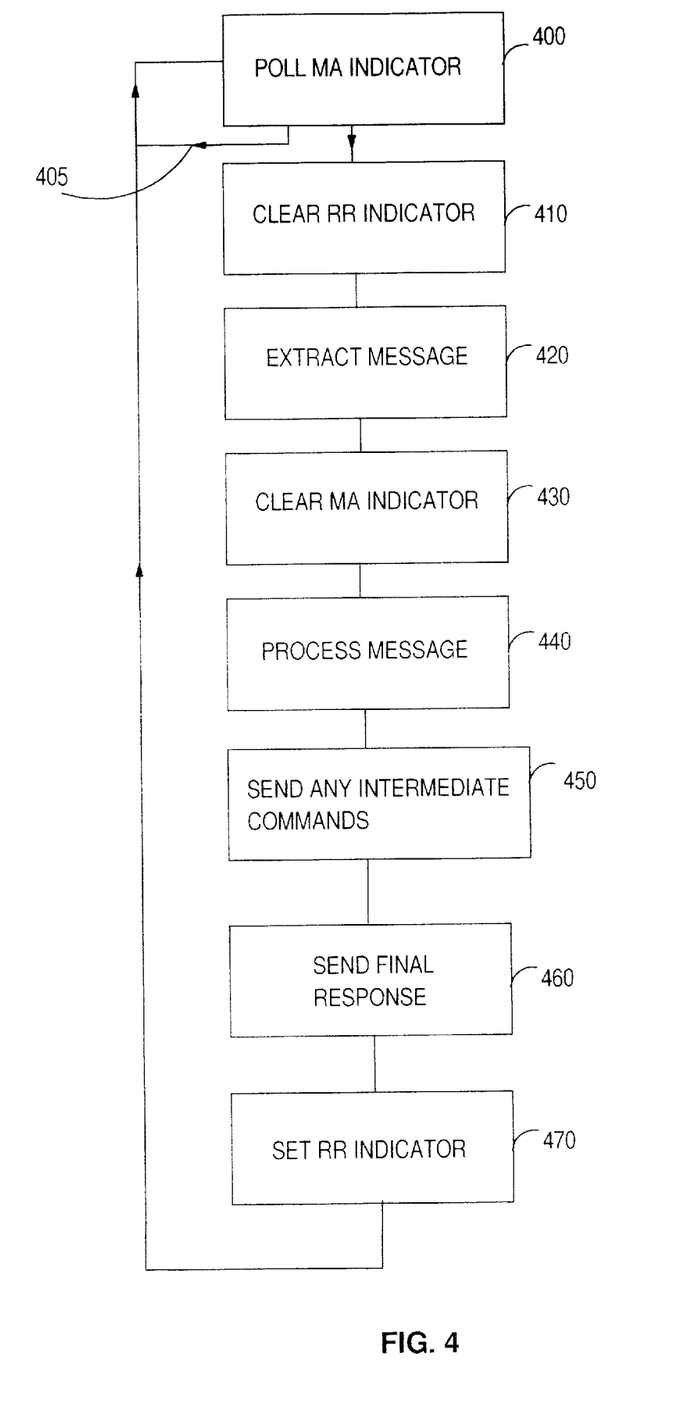

The procedure followed for adapter 120 to receive messages from computer 110 is shown in flow diagram form in FIG. 4. In step 400, adapter 120 polls the MA indicator in the output semaphore 260 to detect the presence or not of any message. If there is no message waiting this polling is repeated periodically as indicated by control path 405. If the MA indicator indicates the presence of a message, the RR indicator of the output buffer is cleared in step 410 in order to inform computer 110 that adapter 120 will not accept any new message until this one is processed and answered. The message is then extracted from output buffer 250 in step 420. The MA indication in output semaphore 260 is cleared in step 430. The AT command contained in the message is then processed in step 440. Any required intermediate responses are sent to computer 110 through the input channel in step 450. The final response to the AT command (i.e., OK, ERROR, or +CME ERROR) is sent to computer 110 is step 460. Finally the RR indicator of the output semaphore 260 is set in step 470 in order to inform computer 110 that adapter 120 is ready to receive the next message. Adapter 120 then returns to its periodic polling of MA for new messages.

Figure 5:
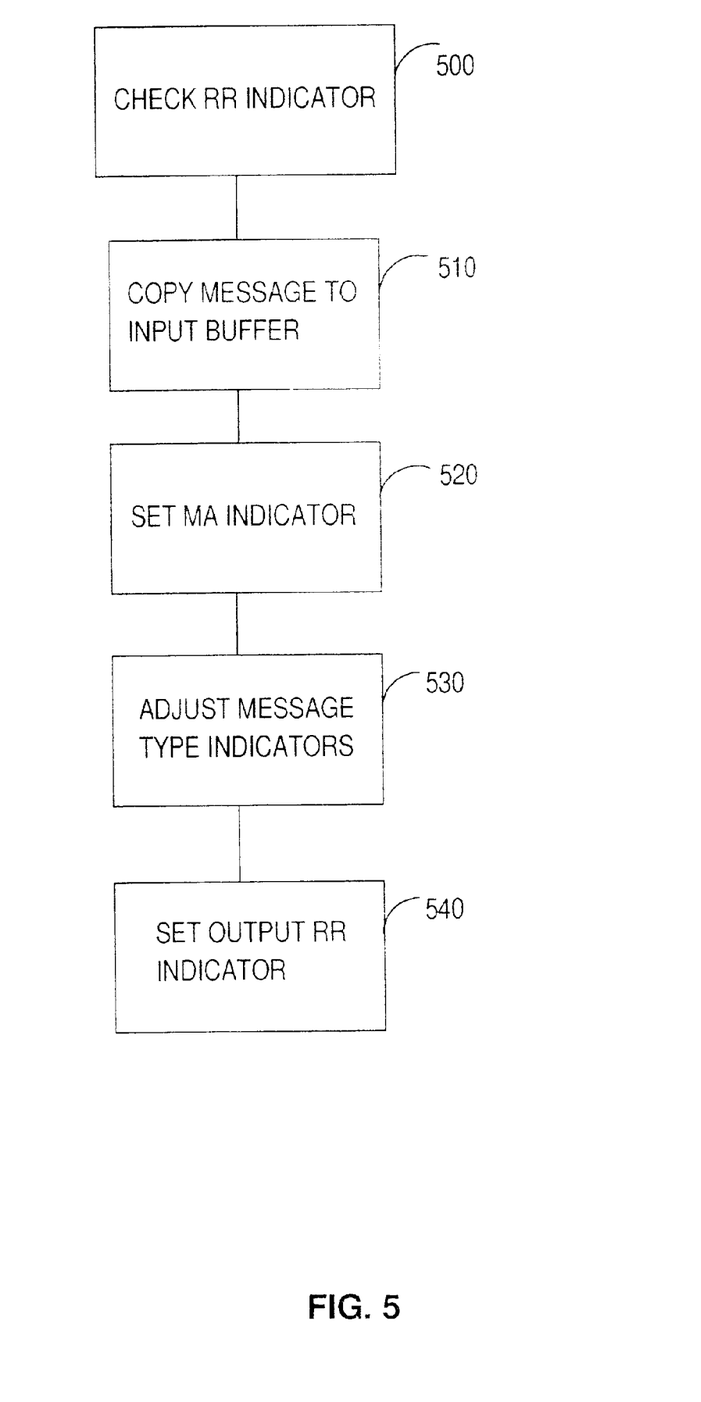

The steps carried out by adapter 120 when it needs to post a message to computer 110 are shown in flow diagram form in FIG. 5. First the ready to receive indicator of the input channel is checked in step 500. If it is on, computer 110 is ready to receive a message. If it is off, computer 110 is not ready to receive a message. This latter condition may occur if adapter 120 attempts to send messages to computer 110 faster than the polling rate of device driver 190. In this instance, adapter 120 queues the message and waits a certain amount of time for the input channel to be released by computer 110. If however the input channel is not released, the output channel will be locked by adapter 120 and a dead lock condition occurs. Application 200, unless it itself is hung, is arranged to detect the dead lock when attempting and repeatedly failing to send messages to the adapter, and should in this event reset the adapter.

It should be noted that alternate channel 205 is not symmetrical in this respect. Computer 110 can request the adapter to unlock or reset the channel when detecting a problem, whereas adapter 120 cannot request any action from computer 110. It is computer 110 which is the master of the alternate channel 205 and it, by means of application 200, is responsible for ensuring its normal operation, and for taking any recovery action.

Next, the message is copied to input buffer 270 in step 510. The MA indicator of the input semaphore 280 is set in step 520 to inform computer 110 that a message is ready for it. The input channel message type indicators of the input channel are adjusted appropriately in step 530. Finally, when and only when the message sent to computer 110 contains the final response to an AT command, adapter 120 sets the RR indicator of the output semaphore 260 in order to inform computer 110 that the current AT command process is complete and that it can send the next one.

Figure 6:
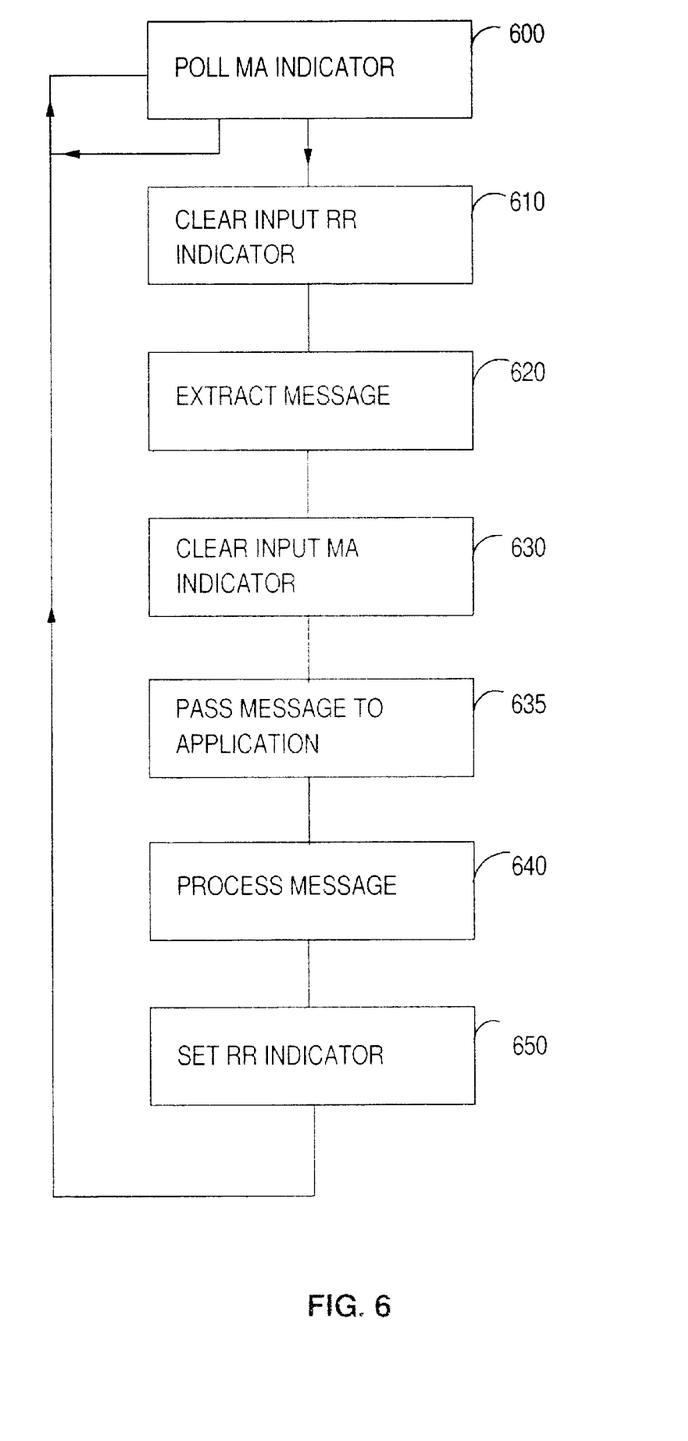

The procedure followed for computer 110 to receive messages from adapter 120 is shown in flow diagram form in FIG. 6. In step 600, device driver 190 polls the MA indicator in the input semaphore 280 to detect the presence of any message. If there is no message waiting this polling is repeated periodically. If the input MA indicator indicates the presence of a message the RR indicator of the input semaphore 280 is cleared in step 610 in order to inform adapter 120 that it will not accept any new message until this one has been processed and forwarded to application 200. The message is then extracted from input buffer 270 in step 620. The MA indication of input semaphore 280 is cleared in step 630. The AT command contained in the message is then passed to application 200 in step 635. Application 200 is responsible for processing the content of the message in step 640. Finally the RR indicator of the input semaphore is set in step 650 in order to inform adapter 120 that it is ready to receive the next message. Device driver 190 then returns to its periodic polling of MA for new messages.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A data communications apparatus comprising:

a general purpose computer;

an adapter for enabling the computer to be connected to a data communications network, the adapter including a data card interface for communicating with the general purpose computer, and a memory having an area which is shared between the computer and the adapter;

a first driver program arranged to provide a first application program with a data transport connection to the data communications network via the data card interface using a serial communications port; and a second driver program arranged to enable a second application program to communicate with the adapter via an output semaphore in the shared memory simultaneously with said first application, wherein the adapter is arranged via an input semaphore in the shared memory to enable the second application to make use of additional data services provided by said network via the second driver program.

2. The apparatus of claim 1 wherein the network is a Global System for Mobile Communications (GSM) radio network.

3. The apparatus of claim 1 wherein the data card interface is a Personal Computer Memory Card International Association (PCMCIA) interface.

4. The apparatus of claim 1 wherein the second driver and the adapter communicate by means of modem industry standard Attention (AT) commands and responses.

5. A method in a data communication apparatus for providing an alternate channel between a computer and an adapter, said adapter having a data card interface for communicating with the computer and a memory having an area which is shared between the computer and adapter, said computer having a first driver program to provide a first application program with a data transport connection to a data communications network via the data card interface with the adapter using a serial communications port, and a second driver program to enable a second application program to communicate with the adapter simultaneously with said first application, said shared memory having a status byte, output buffer, input buffer, output semaphore and input semaphore, said method comprising the steps of:

posting a first message to the adapter by the computer using the output buffer and output semaphore;

receiving said first message by the adapter using said output buffer and output semaphore;

posting a second message to the computer by the adapter using the input buffer and input semaphore; and receiving said second message by the computer using the input buffer and input semaphore.

6. The method of claim 5 wherein the step of posting a first message includes:

reading a status bit in said status byte to determine whether the adapter is ready to receive commands;

reading a ready to receive indicator in said output semaphore to determine if the adapter is ready to receive said first message;

copying said first message to said output buffer; and setting a message available indicator in said output semaphore to inform the adapter that said first message is waiting in said output buffer.

7. The method of claim 6 wherein the step of receiving said first message includes:

polling said message available indicator in said output semaphore by said adapter to detect the presence of said first message;

clearing the ready to receive indicator in said output semaphore by said adapter if said message available indicator indicates the presence of said first message;

extracting said first message from said output buffer by said adapter;

clearing the message available indicator in the output semaphore;

processing a modem industry standard Attention (AT) command in said first message by said adapter;

sending any intermediate responses and a final response to the AT command by said adapter; and setting the ready to receive indicator in said output semaphore by said adapter to inform the computer that said adapter is ready to receive a next message.

8. The method of claim 5 wherein the step of posting a second message includes:

reading a ready to receive indicator in said input semaphore to determine if the computer is ready to receive said second message;

copying said second message to said input buffer;

setting a message available indicator in said input semaphore to inform the computer that second message is ready for the computer to read;

adjusting a message type indicator in said input semaphore to inform the computer of the content of said second message; and setting a ready to receive indicator in said output semaphore to inform the computer that said adapter can receive a new message.

9. The method of claim 8 wherein the step of receiving said second message includes:

polling said message available indicator in said input semaphore by said second driver program to detect the presence of said second message;

clearing the ready to receive indicator in said input semaphore to inform the adapter that the computer will not accept any new message until said second message has been processed and forwarded to said second application;

extracting said second message from said input buffer by said computer;

clearing said message available indicator in said input semaphore;

processing a modem industry standard Attention (AT) command in said second message by said second application; and setting the ready to receive indicator in said input semaphore to inform the adapter that said computer is ready to receive a next message.

* * * * *